April 9, 1940.  E. B. NOWOSIELSKI  2,196,682
MAGNETO GENERATOR
Filed Sept. 29, 1936    4 Sheets-Sheet 1

Witness:
Burr W. Jones

INVENTOR.
Edward B. Nowosielski
BY Clinton A. Jones
ATTORNEY.

April 9, 1940.  E. B. NOWOSIELSKI  2,196,682
MAGNETO GENERATOR
Filed Sept. 29, 1936  4 Sheets-Sheet 2

Witness:
Burr W. Jones

INVENTOR.
Edward B. Nowosielski
BY Clinton S. Janes
ATTORNEY.

April 9, 1940.　　　E. B. NOWOSIELSKI　　　2,196,682
MAGNETO GENERATOR
Filed Sept. 29, 1936　　　4 Sheets-Sheet 4

Witness:
Burr W. Jones

INVENTOR.
Edward B. Nowosielski
BY Clinton S. Janes
ATTORNEY.

Patented Apr. 9, 1940

2,196,682

UNITED STATES PATENT OFFICE 2,196,682

MAGNETO GENERATOR

Edward B. Nowosielski, Sidney, N. Y., assignor to Bendix Aviation Corporation, South Bend, Ind., a corporation of Delaware Application September 29, 1936, Serial No. 103,127

12 Claims. (Cl. 171—209)

The present invention relates to a magneto generator and more particularly to a high tension generator for ignition of internal combustion engines.

It is an object of the present invention to provide a novel magneto generator arranged to furnish a plurality of sparks per revolution, which is efficient and reliable in operation and compact and rugged in construction.

It is another object to provide such a device in which the magnetic circuits are of especially low reluctance.

It is a further object to provide such a device in which the flux of the magnet is transmitted and utilized in a particularly effective manner.

It is another object to provide such a device embodying a novel and improved form of automatic control for timing the breaker mechanism.

It is another object to provide such a device having a built-in spark advance and vacuum-controlled retarding device.

It is another object to provide such a device which is adapted to operate at cam shaft speed of the engine to be ignited.

It is another object to provide such a device which is arranged to be installed on commercial forms of automobile engines without requiring special brackets or gears.

It is another object to provide such a device which may be substituted for commercial forms of battery ignition devices for automobiles without the necessity of changing any other part of the vehicle or its equipment.

Further objects and advantages will be apparent from the following description taken in connection with the accompanying drawings in which.

Figure 1:
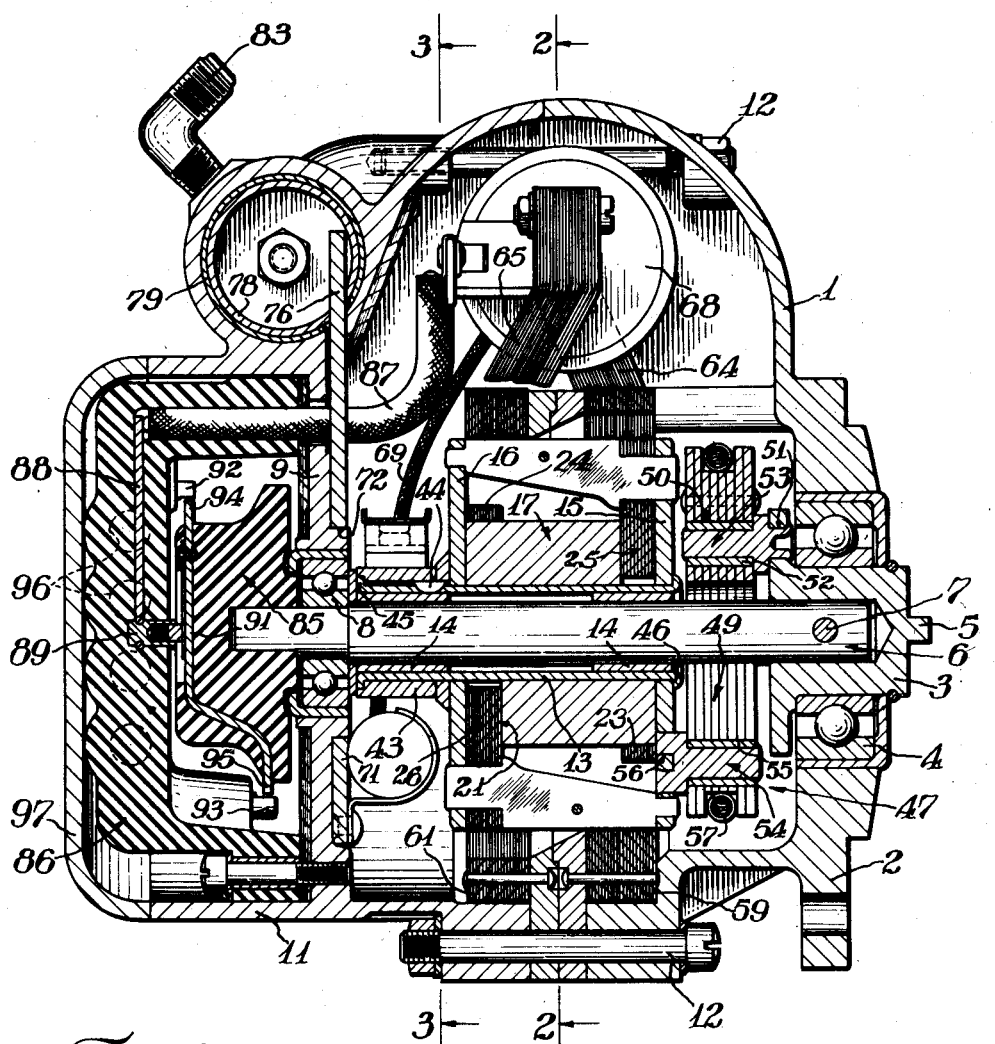
Fig. 1 is a vertical longitudinal section of a preferred embodiment of the present invention.

Referring first to Fig. 1 of the drawings, there is illustrated a casing member 1 provided with a mounting flange 2 arranged to conform with a seat provided on the frame of the engine to be ignited, not illustrated, and to be attached thereto in any suitable manner. A coupling member 3 is journalled as indicated at 4 in the flange 2 of the casing and is formed as indicated at 5 to cooperate with a mating coupling member driven from a shaft of the engine, such as the cam shaft thereof.

A rotor shaft 6 is fixedly mounted in the coupling member 5 in any suitable way as by means of a cross pin 7 and is journalled at its opposite end as indicated at 8 in a wall 9 of a casing member 11 complemental to the casing member 1, and suitably fixed thereto as by means of bolts 12.

Figure 5:
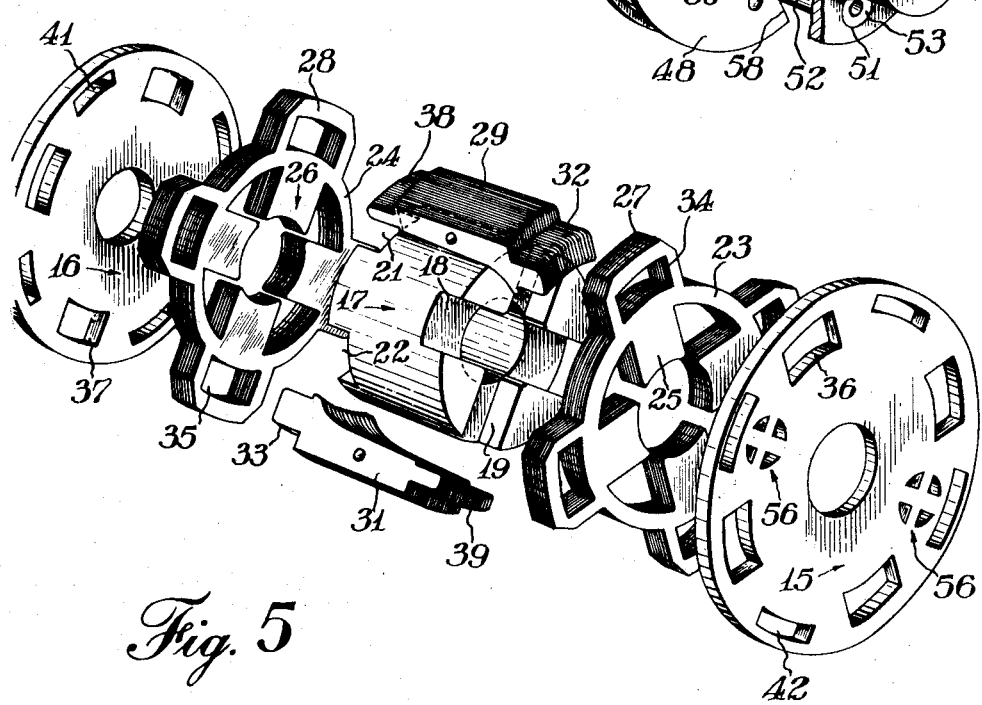
Fig. 5 is an expanded view in perspective of the elements of the rotor.

A hollow shaft or sleeve 13 of non-magnetic material is journalled on the rotor shaft 6 as by means of bushings 14 and carries a pair of non-magnetic circular plates 15 and 16 between which is mounted an axially arranged cylindrical permanent magnet 17. As best shown in Fig. 5, the magnet 17 is provided with intersecting slots or channels 18 and 19 at one end and 21 and 22 at the other end, and cross members or spiders 23 and 24 of highly permeable material such as laminated soft iron are provided with inwardly projecting arms 25 and 26 respectively adapted to enter said slots or channels, and outwardly projecting arms 27 and 28 respectively extending beyond the periphery of the magnet.

Two groups of pole shoes 29 and 31 also formed of highly permeable material are arranged in alternate sequence about the periphery of the magnet 17 extending longitudinally thereof and are provided with projections 32 and 33 arranged to be received in openings 34 and 35 of the spiders 23 and 24 respectively.

The slots 18, 19 and 21, 22 in the ends of the magnet 17 are staggered with respect to each other whereby the spiders 23 and 24 are angularly displaced with respect to each other so that the rotor pole shoes 29 mounted in the spider 23 are intercalated between the pole shoes 31 mounted in the spider 24. The projections 32 and 33 of the pole shoes extend through the spiders 23 and 24 into openings 36 and 37 in the non-magnetic end plates 15 and 16, and the opposite ends of the pole shoes 29 and 31 are also provided with projections 38 and 39 respectively arranged to engage to engage in openings 41 and 42 in the end plates 16 and 15 respectively whereby the pole shoes are supported at both ends rigidly while magnetically connected at one end only to one pole of the cylindrical magnet 17.

A cam 43 (Fig. 1) is mounted on the sleeve 13 beyond the end plate 16, being keyed thereto as indicated at 44, and is retained against longitudinal displacement as by means of a flange 45 on the end of the sleeve. The entire rotor assembly is rigidly unified preferably by spinning over the end of the sleeve 13 against the plate 15 as indicated at 46.

Figure 4:
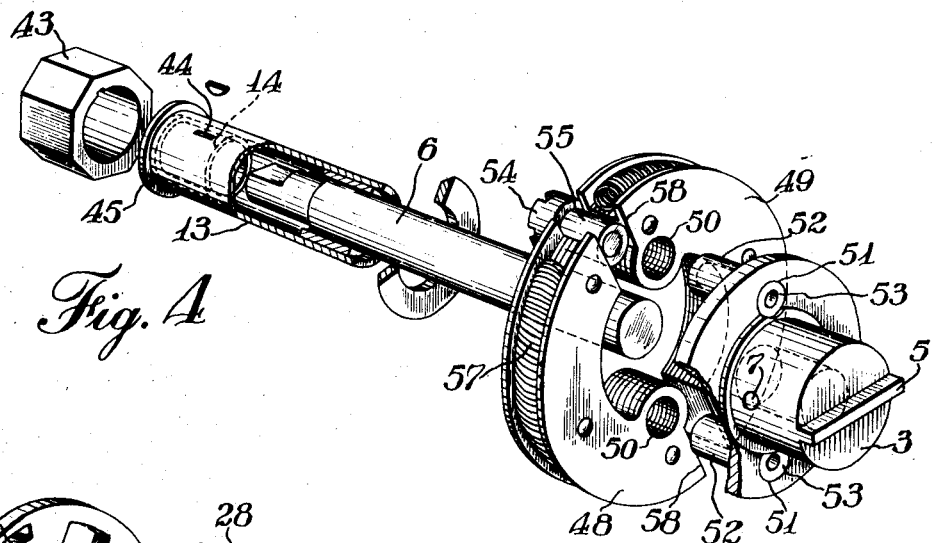
Fig. 4 is an expanded view in perspective of the rotor shaft with its speed-responsive driving mechanism.

The rotor is driven from the coupling member 3 by a centrifugally operated coupling indicated generally at 47 whereby the rotor is advanced with respect to the coupling member 3 and consequently with respect to the engine shaft during rapid rotation thereof. This coupling may be of any preferred form and is illustrated as comprising a pair of weight members 48 and 49 (Fig. 4) located between the coupling member 3 and the rotor plate 15 and arranged to provide an angularly variable connection therebetween. For this purpose, the coupling member 3 is provided with a pair of diametrically spaced openings 51 in which pivot pins 53 are fixedly mounted. Weight members 48 and 49 are provided with openings 50 adapted to receive the pins 53, said pins being preferably bushed as indicated at 52 to provide a suitable journal for the weight members. A pair of diametrically arranged drive pins 54, preferably bushed as shown at 55, are fixedly mounted in segmental openings 56 in the rotor plate 15, in position to bear against the heels 58 of the weight members 48 and 49, whereby outward movement of the weight members under the influence of centrifugal force causes the drive pins 54 to be pushed away from the pivot pins 53, causing the rotor to be advanced with respect to the coupling member 3. A spring 57 is provided for normally holding the weight members in collapsed position.

Figure 2:
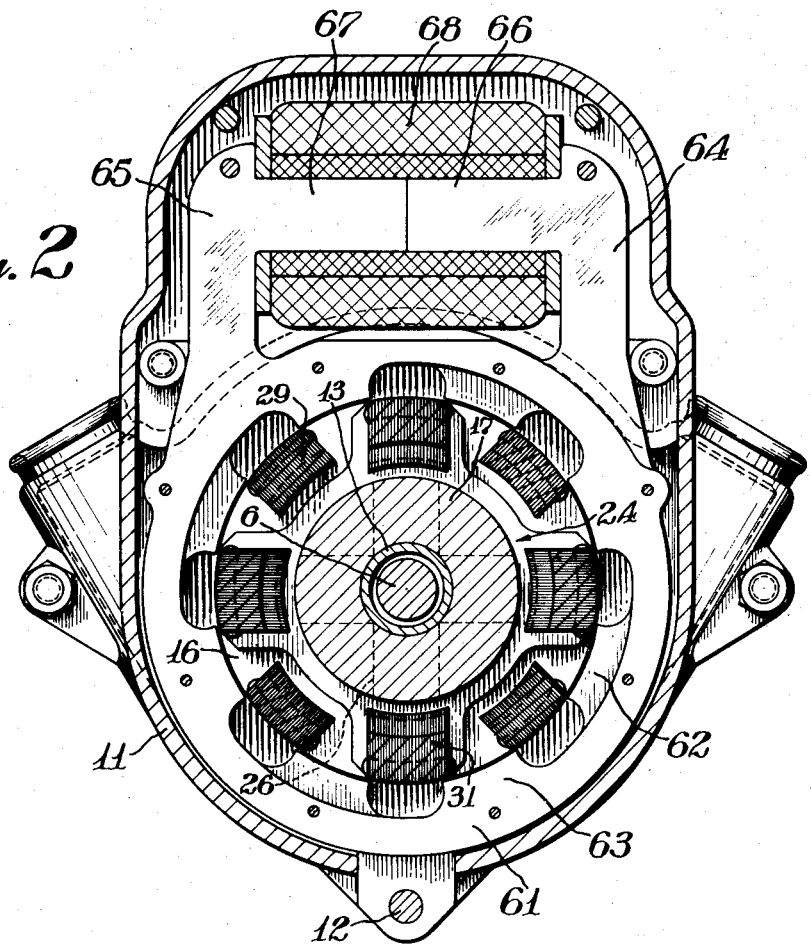
Fig. 2 is a vertical section taken substantially on the line 2—2 of Fig. 1.

An external magnetic circuit is provided comprising a pair of annular inductor members 59 and 61 (Fig. 1) rigidly mounted in any suitable way in the casing members 1 and 11 so as to surround the rotor and the pole shoes 29, 31 thereof in longitudinally spaced relation. The inductor 59 is provided with four inwardly extending projections 62 (Fig. 2), and the inductor 61 is provided with a corresponding number of inwardly extending projections 63. These projections closely surround the rotor pole shoes 29 and 31 and cooperate selectively therewith whereby each inductor is connected alternately with the groups of pole shoes 29 and 31 in sequence as the rotor revolves.

Inductors 59 and 61 are provided with longitudinally inclined arms 64 and 65 respectively which are provided with extensions 66 and 67 arranged transverse to the rotor and forming a core for an induction coil 68 of conventional design.

Figure 3:
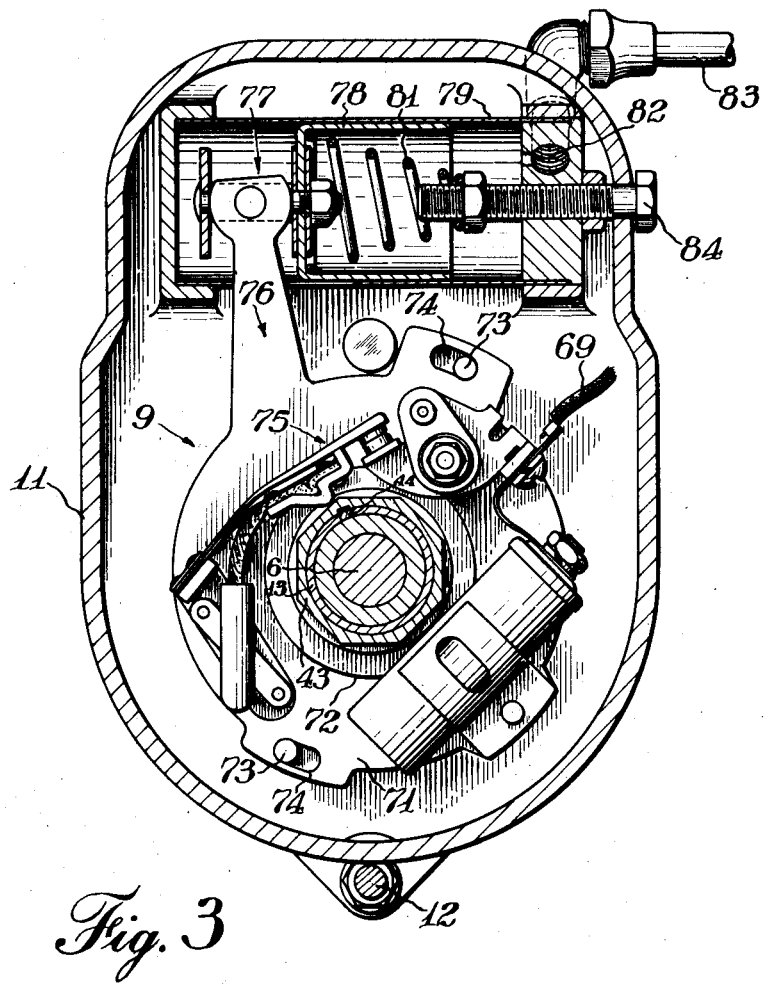
Fig. 3 is a vertical section taken substantially on the line 3—3 of Fig. 1.

The ungrounded primary lead 69 (Fig. 1) of the induction coil is connected to a breaker mechanism (Fig. 3) which is oscillatably mounted on the partition 9 of the casing 11. The breaker mechanism comprises a mounting plate 71 journalled on a shoulder 72 of the partition for rotary movement limited in any suitable way as by means of pins 73 mounted in the partition and movable within slots 74 in plate 71.

A breaker device indicated generally at 75 is mounted on the plate 71 and serves to ground the lead 69 periodically under the control of the cam 43 in a conventional manner.

Means are provided for rotating the plate 71 to retard the spark during slow rotation of the engine under heavy load. As here shown, this means is in the form of an arm 76 extending from the plate 71 and having a pivotal connection 77 to a piston member 78 slidably mounted in a cylinder 79 formed in casing member 11. A spring 81 is provided for normally rotating the arm 76 in position to retard the spark, and a connection 82 is provided for receiving a conduit 83 communicating with the intake manifold, not illustrated, of the engine whereby vacuum in said intake manifold causes evacuation of the cylinder 79 whereby the piston 78 is caused to overcome the spring 81 and rotate the breaker plate 71 in a direction to advance the spark.

The tension of the spring 81 may be adjusted in any suitable manner as by means of the abutment bolt 84.

A distributor rotor 85 (Fig. 1) is non-rotatably mounted on the end of the rotor shaft 6 beyond the partition 9, and a distributor block 86 is mounted in the casing 11 surrounding the distributor rotor 85. The distributor block is arranged to receive the secondary lead 87 from the induction coil 68 and conduct high tension current therefrom by means of a conductor 88 to a central electrode 89 arranged to cooperate with a conductor 91 carried by the distributor rotor. The distributor block is also provided with inwardly extending electrodes 92 and 93 arranged to receive high tension current from the terminals 94 and 95 respectively of the distributor rotor conductor 91. Two groups of output leads 96 are connected to the electrodes 92 and 93 respectively on each side of the magneto, which leads are connected to the spark plugs of the engine to be ignited.

The distributor mechanism is preferably enclosed by a cap 97 of any suitable character mounted on casing 11 and supporting the output leads 96.

In the operation of the device, rotation of the coupling member 3 from the cam shaft of the engine causes the magnetic rotor to revolve therewith, thus bringing the groups of rotor pole shoes 29 and 31 into cooperation with the stationary pole shoes 62 and 63 of the inductors 59 and 61 respectively in sequence. Since, as here illustrated, there are four each of pole shoes 29 and 31, it will be seen that a reversal of flux through the inductors 59 and 61 and consequently through the induction coil 68 takes place for each 45 degrees of rotation of the rotor. The magneto therefore is adapted to provide eight sparks per revolution. The cam 43 is consequently provided with eight lobes and operates to close and open the primary circuit of the coil eight times for each revolution.

During slow rotation of the engine, the centrifugal spark advance 47 is fully retarded, but when the engine speeds up, the centrifugal device operates to advance the rotor with respect to the engine shaft in the well-known manner.

When the engine is rotating slowly with a wide open throttle, the retarding device for the breaker operates by reason of the expansion of spring 81 to rotate the breaker plate 71 into retarded position. As soon as vacuum builds up in the engine intake, however, this vacuum causes the piston 78 to move in response thereto, compressing the spring 81 and rotating the breaker plate in a direction to advance the spark.

It will be observed that by reason of the novel arrangement of the magnetic circuits with the circular inductors arranged to cooperate with a plurality of rotor pole shoes simultaneously, and the spiders 23 and 24 extending into the slots in the ends of the magnet 17, the flux of the magnet is transmitted very efficiently through the external magnetic circuit.

Although the device has been illustrated as arranged to furnish eight sparks per revolution and thus be adapted for use with an eight-cylinder engine, it will be readily understood that the novel arrangement and the design of the magnetic circuits is readily adaptable to other types of multi-cylinder engines, and various other changes may be made in the specific features of the device without departing from the spirit of the invention as defined in the claims appended hereto.

What is claimed is:

1. In a magneto a casing having an end wall and a partition spaced therefrom in substantially parallel relation, a coupling member arranged to be driven from an engine, journalled in said end wall, a rotor shaft fixed in said coupling member and journalled in said partition, a magnetic rotor journalled on said shaft, an angularly variable connection between the coupling member and rotor, a breaker cam mounted on said rotor adjacent said partition, and breaker mechanism operable thereby, rotatably mounted on the partition.

2. In a magneto a casing having an end wall and a partition spaced therefrom in substantially parallel relation, a coupling member arranged to be driven from an engine, journalled in said end wall, a rotor shaft fixed in said coupling member and journalled in said partition, a magnetic rotor journalled on said shaft, a centrifugally controlled variable connection between the coupling member and rotor, a breaker cam mounted on said rotor adjacent said partition, breaker mechanism operable thereby, rotatably mounted on the partition, and means in said casing operable by a running function of the engine to control the angular relation of the breaker mechanism to the cam in accordance with load conditions of the engine.

3. In a magneto a casing having an end wall and a partition spaced therefrom in substantially parallel relation, a coupling member arranged to be driven from an engine, journalled in said end wall, a rotor shaft fixed in said coupling member and journalled in said partition, a magnetic rotor journalled on said shaft, an angularly variable connection between the coupling member and rotor, a breaker cam mounted on said rotor adjacent said partition, breaker mechanism operable thereby, rotatably mounted on the partition, said breaker mechanism having an operating arm for adjusting its angular position, means yieldably urging said arm toward a position of retard of the breaker mechanism with respect to the cam, and means adapted to be operated by the intake vacuum of an engine to overcome the yielding means and move the arm to advance the breaker mechanism.

4. In a high tension magneto generator a rotor comprising a generally cylindrical magnet with axially arranged poles, two groups of pole shoes axially arranged about the periphery of the magnet, radially spaced therefrom, means for conducting flux from each pole of the magnet to one of said groups of rotor pole shoes, and a pair of stator pole shoe members surrounding said rotor adjacent the ends thereof and having staggered sets of pole shoes arranged to cooperate alternately with each group of rotor pole shoes.

5. In a magneto rotor a generally cylindrical magnet having axially located poles, the polar faces of said magnet having transverse slots formed therein, pole shoes arranged coaxially to the magnet, and means traversing said slots for conducting flux from the magnet to said pole shoes.

6. In a magneto rotor, a generally cylindrical magnet having axially located poles, the polar faces of said magnet having radial slots formed therein, pole shoes arranged coaxially to the magnet, radially spaced therefrom, and cross members of highly permeable material traversing said slots and extending radially therefrom for conducting flux from the magnet to said pole shoes.

7. In a magneto rotor, a generally cylindrical magnet having axially located poles, the polar faces of said magnet having radial slots formed therein, pole shoes arranged coaxially to the magnet, radially spaced therefrom, cross members filling said slots and extending radially into engagement with said pole shoes, and non-magnetic means formed to receive the ends of the pole shoes and retain the pole shoes and cross members in assembled relation.

8. In a magneto a shaft, a rotor mounted thereon including a cylindrical magnet and a plurality of peripheral longitudinally extending pole shoes of opposite polarity arranged in sequence, anchored at both ends to said shaft, a stator having an external magnetic circuit including a pair of ring-shaped inductors surrounding axially spaced portions of the rotor and having inwardly extending pole shoes adapted to cooperate selectively with the rotor pole shoes of each polarity in sequence, and an induction coil arranged transverse to the axis of the rotor, said external magnetic circuit including core elements traversing said coil, and inclined portions connecting the inductor rings thereto.

9. In a magneto rotor a cylindrical magnet having polar end surfaces traversed by radial slots, permeable cross members fitting in said slots and having radial extensions in alignment with said slots, and pole shoes mounted in said extensions coaxially to the magnet.

10. In a magneto a rotor including a cylindrical magnet having polar end surfaces traversed by radial slots, the slots in each end being in staggered relation, permeable cross members fitting in said slots and having radial extensions in alignment with said slots, and two sets of pole shoes mounted in said extensions coaxially to the magnet in overlapping staggered relation.

11. In a magneto a rotor including a cylindrical magnet having polar end surfaces traversed by radial slots, the slots in each end being in staggered relation, permeable cross members fitting in said slots and having radial extensions in alignment with said slots, two sets of pole shoes mounted in said extensions coaxially to the magnet in overlapping staggered relation, an induction coil, and means including a pair of inductor rings arranged to cooperate alternately with said sets of pole shoes and conduct the flux therefrom through said coil.

12. In a magneto a rotor including a cylindrical magnet having polar end surfaces traversed by radial slots, the slots in each end being in staggered relation, permeable cross members fitting in said slots and having radial extensions in alignment with said slots, two sets of pole shoes mounted in said extensions coaxially to the magnet in overlapping staggered relation, an induction coil, and means including a pair of axially spaced inductor rings having inwardly projecting pole shoes in staggered relation arranged to cooperate alternately with said sets of pole shoes and cause the flux therefrom to reciprocate through the coil when the rotor revolves.

EDWARD B. NOWOSIELSKI.